United States Patent Office 3,615,032
Patented Oct. 26, 1971

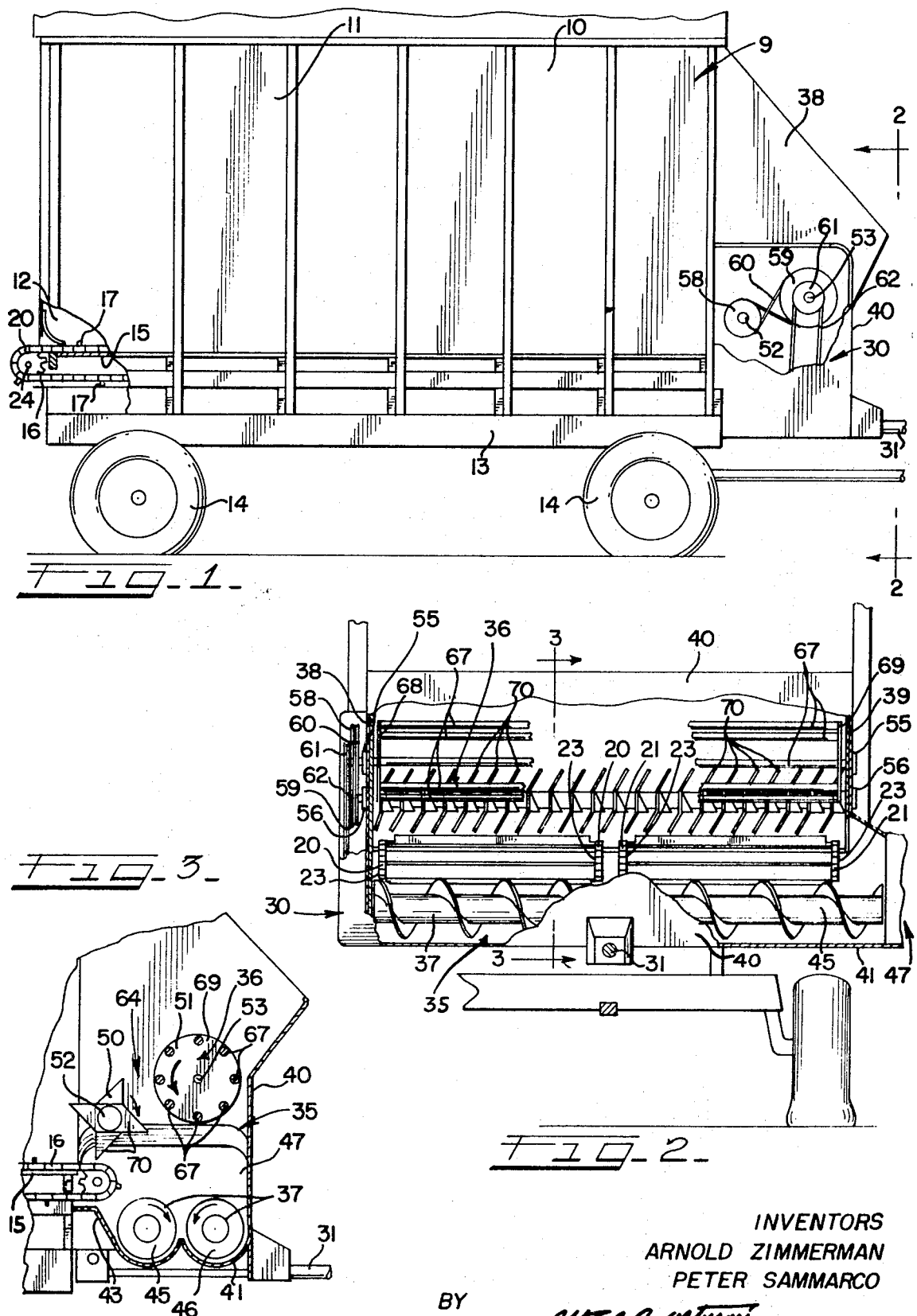

3,615,032
FORAGE METERING MECHANISM
Arnold Zimmerman, Downers Grove, and Peter Sammarco, Bellwood, Ill., assignors to International Harvester Company, Chicago, Ill.
Filed Sept. 24, 1969, Ser. No. 860,561
Int. Cl. B60p 1/36
U.S. Cl. 214—519
9 Claims

ABSTRACT OF THE DISCLOSURE

A mechanism to meter the unloading of material onto a conveyor from a self-unloading wagon, the mechanism comprising a pair of parallel rotors superposed with respect to the conveyor and being rotatable in opposite directions and at substantially different speeds, wherein the slower rotor acts to block material from falling upon the conveyor and serves to deliver material deposited thereupon to the faster rotor which coacts with the slower rotor to shred and meter material passing therebetween to thereby meter the size and amount of it passing to the conveyor.

BACKGROUND OF THE INVENTION

The conventional self-unloading wagon used for farming operations is a versatile material-handling implement adaptable to a number of farming operations requiring the moving and distributing of crop or other materials such as forage. Wagons of this type are generally constructed to include a box-like structure circumscribing a material-supporting bed. Arranged to move over the face of the bed are a series of interconnected driven slats, or the like, which can be selectively driven either fore or aft across the bed, and thereby move material deposited thereon either forwardly or rearwardly of the wagon for eventual discharge therefrom.

To facilitate the handling of discharging material, a cross conveyor is usually attached or placed at one end of the wagon to receive and convey material therefrom. It is customary to have disposed across that end of the wagon a number of superposed driven beaters which intercept the material moving en masse, and serve to break the compacted material into a suitable size which will not choke, plug or overload the cross conveyor or an associated conveying system (such as a hopper type blower or elevator) being fed by the cross conveyor.

Often in actual use the wagons are filled to capacity and the load is, as a matter of practice, piled to a height beyond the uppermost beater. This results in large clumps of material breaking from the mass and being dropped on the conveyor causing the conveyor to handle uncontrollable quantities of material which can result in clogging the material conveying mechanism. To avoid this, manufacturers of self-unloading wagons have provided wagons with an optional upper beater assembly which can be added above those normally used. This is disadvantageous because, besides requiring additional machinery, it results in a high profile wagon and necessitates a partial disassembling of the beater portion of the wagon when it is used for bale or ear corn handling operations. This obviously involves additional labor to continuous assembly and disassembly of a portion of the wagon depending on the operation for which it is to be adapted.

It is a general object of the instant invention to provide a material metering mechanism for use on a self-unloading wagon which is operative to meter a predetermined and substantially constant quantity of material to an associated cross conveyor.

A further object of the invention is to provide a metering mechanism which will eliminate the need for conventional superposed beaters across the end of the self-unloading wagon thereby permitting the wagon to have a low profile desirable for other farming operations such as bale or ear corn usage.

Another object of the invention is to provide a metering mechanism on which material can be loaded prior to operation to thereby increase the effective hauling capacity of the wagon.

A still further object of the invention is to provide a metering mechanism that is interposed between an unloading end of the self-unloading wagon and an associated cross conveyor to intercept material from the wagon and effective to break apart compacted material and meter the same to a cross conveyor to eliminate clogging of the cross conveyor or associated material handling systems.

Another object of the foregoing invention is to provide a metering mechanism having an embodiment which incorporates a pair of substantially horizontally driven beaters disposed adjacent and in substantially horizontal alignment across this end of the material bed of the self-unloading wagon with the cross conveyor located therebeneath.

A still further object of the foregoing is to provide a metering mechanism which is effective to receive large clumps of compacted material such as forage on said beater which are rotating at different speeds in opposite directions to effect both a predetermined reduction of the compacted material and a metering of the same to the cross conveyor therebelow.

BRIEF DESCRIPTION OF THE DRAWINGS

FIG. 1 is an elevational view of a self-unloading wagon and associated cross conveyor attached thereto of the type adaptable for use with the instant invention;

FIG. 2 is a fragmentary end view with parts cut away taken substantially at lines 2—2 of FIG. 1;

FIG. 3 is a fragmentary elevational sectional view take substantially at line 3—3 of FIG. 2.

DESCRIPTION OF THE PREFERRED EMBODIMENT

Referring to FIG. 1, which shows an agricultural self-unloading wagon 9; the wagon includes a material-holding box 10 having laterally spaced sides 11 and 12 carried on a frame 13 having ground engaging wheels 14. The wagon has a material-receiving bed 15 and a dual bed conveyor 16 having two sections of material-engaging slats 17 each of which are drivingly interconnected by pairs of longitudinal chains 20 and 21. The pairs of chains (20, 20 and 21, 21) are each driven by sprockets 23 and 24 which in turn are connected to a drive train generally designated 30. The drive train 30 is connectable to a conventional take-off of a tractor (not shown) through the drive shaft 31. The power train 30 is selectively operable to drive the bed conveyor in either direction across the upper face of the bed 15 for moving forage or the like deposited thereon longitudinally of the wagon to facilitate loading and unloading of the box 10.

A transverse unloading mechanism generally designated 35 is mounted on the frame 13 at the forward end of the wagon to facilitate lateral unloading of material from the wagon for particular situations, such as in bunk feeding, or unloading into hoppers of associated material-handling apparatus such as blowers or conveyors. In the particular embodiment disclosed, the unloading mechanism 35 includes the instant invention, namely, a metering device, generally designated 36 superposed over a material cross conveyor, designated 37.

The unloading mechanism 35 comprises a pair of upright side walls or panels 38 and 39 connected to the frame 13 and extending forwardly from the walls 11 and 12 of the box 10. Partially inclined and transverse forward wall 40 joins the side walls 38, 39 and extends upwardly from a bottom wall 41 disposed beneath the cross conveyor 37. The bottom wall 41 merges into a rear transverse wall portion 43 to form a material chute communicating the box 10 to the conveyor 37. It can be appreciated that the effective load capacity of the wagon is thereby increased by increasing the length thereof with the unloading mechanism 35.

The cross conveyor in this embodiment has been shown as a pair of augers 45 and 46, respectively, drivingly connected to the power high train 30 which in turn selectively drive the augers to convey and discharge material disposed in the side wall 39 in bearing holders 55 an d56. The shafts 52 and 53 other forms, such as a single auger or endless belt type, without altering the inventive concept of the invention disclosed herein.

The metering device 36 comprises a pair of parallel rotors 50 and 51 each having their respective center shafts 52 and 53 horizontally oriented over the cross conveyor 37. The shafts 52, 53 are journaled at each of their respective ends through the side walls 38 and 39 in bearing holders 55 and 56. The shafts 52 and 53 each have one of their end portions pass through the wall 38 to accommodate pulleys 58 and 59 mounted respectively thereon and arranged in alignment with each other. An endless belt 60 is entrained about the pulleys 58 and 59 and is effective to drive the rotor 50.

On the outer end of shaft 53 is secured another pulley 61 driven by an endless belt 62 entrained thereabout. The belt 62 is operatively connected to the main drive train 30 and is driven in conjunction with the augers 45 and 46 of the cross conveyor 37.

As best seen in FIG. 3 the rotors 50 and 51 are located outwardly from the forward end of the conveyor bed 16 and over the cross conveyor 37. The rotors are positioned in spaced relation with respect to each other to define a gap 64 therebetween. The rotor 51 disposed adjacent the front wall 40 acts as a material retarder by intercepting and catching large clods of material that break off and fall toward the conveyor 37 from the load in the wagon. The main drive train 30 by means of pulley 61 drives this rotor 51 to rotate slowly in the direction indicated by the arrow thereby moving the material toward the rotor 50 which is driven at a faster rate and thus acts as a beater. The rotor 51 has a skeletal cylindrical-like surface comprising a plurality of rods 67 connected circumferentially and equidistantly in spaced relation to the center shaft 53 by end plates 68 and 69 connected to rotate in conjunction therewith. This construction acts to retain and support material deposited thereon which is too large to fall between the spaced rods 67. However, it is contemplated that a screen or grid type surface which would serve to intercept and transport smaller sizes of material deposited thereon toward the gap 64 would also be functionally acceptable in lieu of the disclosed embodiment of the rotor 51.

The rotor 50 comprises a plurality of axially arranged disc-like knives 70 secured thereto. The rotor is driven to rotate at a substantially higher speed than the retarder rotor 51 due to the drive ratio difference of the pulleys 58 and 59. As a result of the higher speed of the beater rotor 50, it acts to cut the material and serves as a shredding mechanism to reduce material to a size acceptable to the cross conveyor and associated material-handling apparatus. Thus shredding is effected by a coaction with the slower rotor 51 at the gap 64. Through this coaction of the two rotors the size and the amount of material metering to the cross conveyor 37 through the gap 64 is substantially controlled through relative speeds of the two rotors. Various speeds and attendant feed rates can be selected by changing the size of the pulleys 58 and 59 to effect different drive ratios between them as required by a particular crop or condition. However, a suggested rotational speed selection for forage would be approximately 30 revolutions per minute for the retarder rotor 51 where the beater rotor is driven to rotate at approximately 180 revolutions per minute. It should be noted that the quantity of material metered to the cross conveyor as well as the size of material delivered to the conveyor 37 will be a function of the gap 64 between the rotors (51, 50). Therefore various quantities of controlled sizes can be metered to the cross conveyor by changing the driving ratio and consequently the relative speed between the two coacting rotors.

It can be appreciated that the side walls 38 and 39 together with the transverse wall 40 effectively increases the length of the wagon because the rotors 50 and 51 are so positioned to effectively cover the rotors of the cross conveyor making it possible to fill the wagon so that the load covers the rotors thereby increasing the hauling capacity of the wagon without an increase in length.

While the invention has been described in connection with the embodiment thereof, it will be understood that it is capable of modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth.

What is claimed is:

1. In a self-unloading wagon of the character disclosed having laterally spaced side walls with a material receiving bed therebetween, a bed conveyor on said bed operable to move material longitudinally of said wagon to an output end thereof for discharge onto a cross conveyor mounted transversely on said wagon, the cross conveyor being located outwardly adjacent said output end in a material receiving position below said bed conveyor, the improvement comprising: material metering means including a plurality of elements rotatable on oppositely driven axes horizontally arranged in fore and aft spaced relationship and collectively disposed outwardly beyond the output end of said bed conveyor and providing means for supporting thereabove material delivered thereto by the bed conveyor over said cross conveyor and providing a crop discharge gap therebetween in generally vertical alignment with the cross conveyor.

2. In a self-unloading wagon having laterally spaced side walls with a material receiving bed therebetween, a bed conveyor on said bed operable to move material longitudinally of said wagon to at least one output end thereof, a cross conveyor mounted transversely of said wagon and adjacent said output end of the bed conveyor in a material receiving position outwardly from and below said output end, the improvement comprising: a housing having an upright wall extending upwardly from said cross conveyor and disposed transversely of said output end in spaced relation thereto to form a material chute from said output end to said cross conveyor, metering means disposed in the space between the output end of the bed conveyor and the upright wall and forming a material-support bed above the cross conveyor and substantially covering the same widthwise and operative to intercept, carry thereupon, and reduce compacted material to a predetermined size, and said metering means comprising a plurality of elements rotatable on oppositely driven axes and defining a downwardly discharging metering opening oriented in vertical alignment with said cross conveyor and elongated generally parallel with the delivery direction of said cross conveyor to meter a quantity of the material passing therethrough to said cross conveyor.

3. The invention according to claim 2 and said metering means comprising a pair of coactive first and second rotors having axes of rotation substantially parallel to each other in substantial horizontal disposition over said cross conveyor in a material supporting position adjacent to said output end of said bed conveyor and said cross conveyor, and means operatively connected to said rotors to rotate the same, and said second rotor disposed adjacent said upright wall with its axis of rotation disposed above the axis of rotation of said first rotor and rotatable on its upper side toward the first rotor to effect an inclined pitch toward said first rotor.

4. The invention according to claim 3 and said parallel rotors having a spaced relation to each other defining said metering opening therebetween, and said rotor rotating means operative to rotate the rotors in an opposite direction to effect a rotation of each rotor downwardly toward said opening.

5. The invention according to claim 4 and said rotor rotating means including means to drive each of said rotors at different speeds wherein said first rotor adjacent the bed conveyor of the wagon is rotated substantially at faster speed than the second rotor adjacent said upright wall.

6. In a self-unloading wagon having laterally spaced side walls with a material receiving bed therebetween, a bed conveyor on said bed operable to move material longitudinally of said wagon to at least one output end thereof, a cross conveyor mounted transversely of said wagon and adjacent said output end of the bed conveyor in a material receiving position outwardly from and below said output end, the improvement comprising: a housing having an upright wall extending upwardly from said cross conveyor and disposed transversely of said output end in spaced relation thereto to form a material chute from said output end to said cross conveyor, metering means disposed in the space between the output end of the bed conveyor and the upright wall and forming a material-support bed above the cross conveyor and operative to intercept and reduce compacted material to a predetermined size and meter a quantity of the same passing therethrough to said cross conveyor, said metering means comprising a pair of coactive first and second rotors having axis of rotation substantially parallel to each other in substantial horizontal disposition over said cross conveyor in a material supporting position between said output end of said wagon and said cross conveyor, and means operatively connected to said rotors to rotate the same, and said second rotor disposed adjacent said upright wall with its axis of rotation disposed above the axis of rotation of said first rotor to effect an inclined pitch toward said first rotor, said parallel rotors having a spaced relation to each other defining a gap therebetween, said rotor rotating means operative to rotate the rotors in an opposite direction to effect a rotation of each roor downwardly toward said gap, said rotor rotating means including means to drive each of said rotors at different speeds wherein said first rotor adjacent the bed conveyor of the wagon is rotated substantially at faster speed than the second rotor adjacent said upright wall, said second rotor adjacent said upright wall having a cylindrically shaped outer surface effective to support material as it is conveyed toward said first rotor, and said first rotor comprising a plurality of axially disposed teeth-like elements operative to meter material to the cross conveyor and reduce compacted material to a size having at least one dimension substantially equivalent to that of said gap between said rotors.

7. In a self-unloading wagon having spaced side walls and an intervening material-receiving bed, a bed conveyor on said bed operable to move material longitudinally of the wagon to an output end thereof for discharge to a cross conveyor mounted transversely said wagon, the improvement comprising: a material metering means including a pair of substantially parallel rotors rotatably mounted between said walls and extending transversely of said bed in intercepting relation to material being delivered thereto by the bed conveyor, one rotor having a generally cylindrically shaped outer surface, and the other rotor being located between the bed conveyor and the one rotor and having axially spaced teeth-like elements for shredding the oncoming material from the bed conveyor, said rotors defining a material discharged gap therebetween over the cross conveyor and said rotors operative to meter material to the cross conveyor and reduce compacted material to a size having at least one dimension substantially equivalent to that of said gap between said rotors, and means for reversely rotating said rotors at different speeds and toward the gap on their upper sides.

8. The invention according to claim 7 and said means to rotate said rotors including means to rotate said first rotor at a speed substantially faster than the second rotor.

9. In a self-unloading wagon having spaced side walls and an intervening material-receiving bed, a bed conveyor on said bed operable to move material longitudinally of the wagon to an output end thereof for discharge to a cross conveyor mounted transversely on said wagon, the improvement comprising: material metering means located vertically above the cross conveyor and including a pair of substantially parallel rotors rotatably mounted between said walls and extending transversely of said bed in intercepting relation to material being delivered thereto by the bed conveyor, said rotors having opposed side portions defining therebetween a discharge gap having an inlet side for receiving such oncoming material and an outlet side from which material compacted between the opposed side portions is discharged to the cross conveyor, and means for rotating said rotors at different speeds and in respective opposite directions to sweep their opposed side portions from the inlet side of said gap toward the outlet side thereof and shred the material therebetween.

References Cited
UNITED STATES PATENTS

| | | | |
|---|---|---|---|
| 1,712,549 | 5/1929 | Castellano et al. | 222—238 |
| 2,676,002 | 4/1954 | Wolfe | 214—83.14 X |
| 2,772,796 | 12/1956 | Hansen | 214—83.14 |
| 3,084,821 | 4/1963 | Knight | 214—83.14 X |
| 3,164,276 | 1/1965 | Bastian | 214—519 |
| 3,189,204 | 6/1965 | Wiberg | 214—519 |
| 3,214,050 | 10/1965 | McConeghy Jr. | 214—519 |
| 3,520,434 | 7/1970 | Destefan et al. | 214—83.14 X |

ALBERT J. MAKAY, Primary Examiner

U.S. Cl. X.R.

214—83.14; 222—238